J. SEBETO.
LIFE SAVING DEVICE.
APPLICATION FILED NOV. 1, 1919.
1,339,227.
Patented May 4, 1920.
2 SHEETS—SHEET 1.
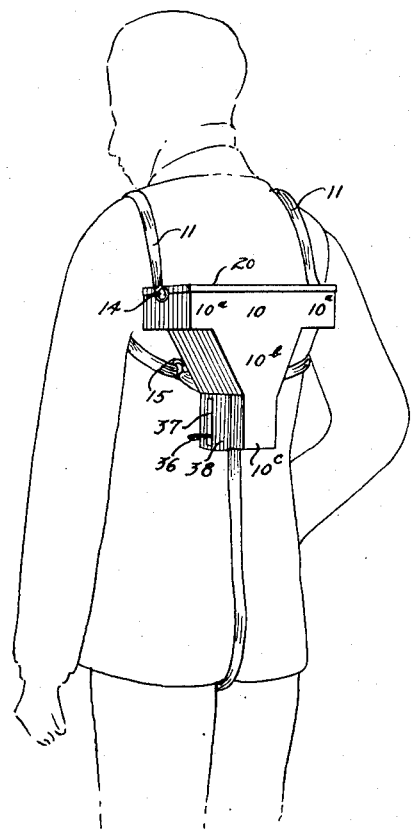
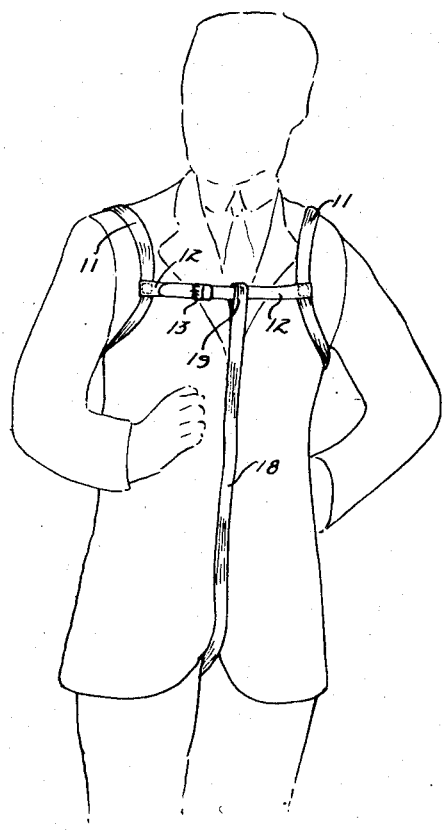
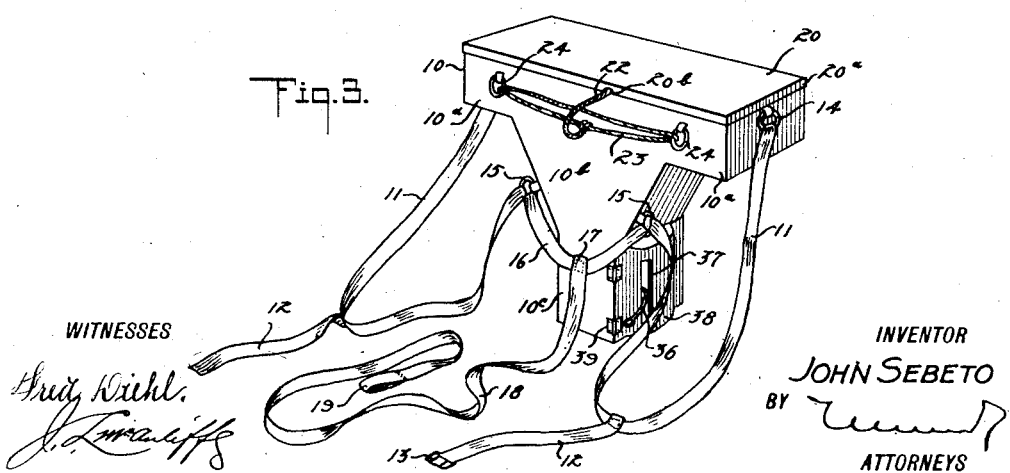
WITNESSES
INVENTOR
JOHN SEBETO
BY
ATTORNEYS

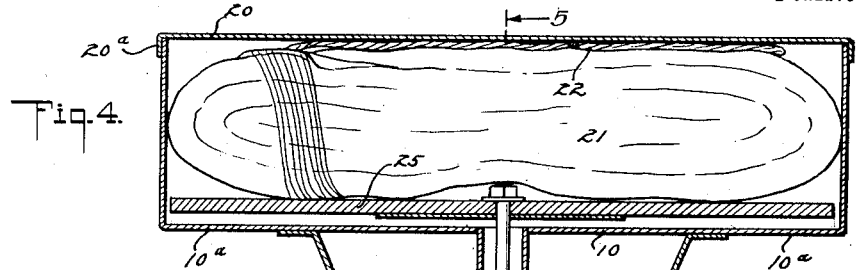
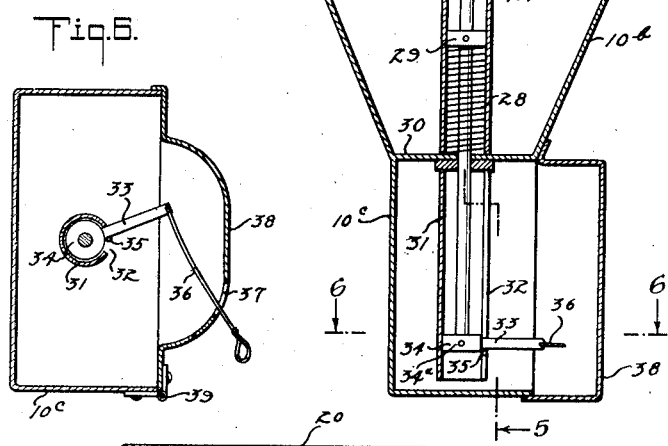
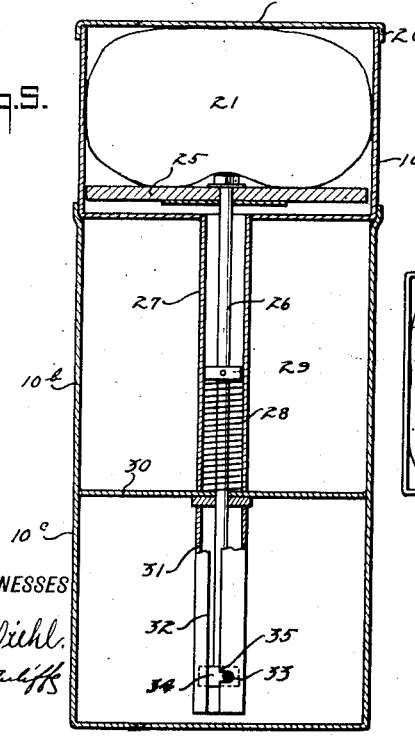
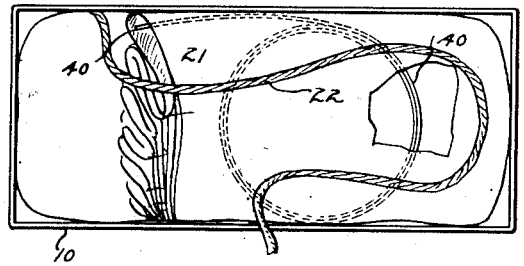

UNITED STATES PATENT OFFICE.

JOHN SEBETO, OF BROOKLYN, NEW YORK.

LIFE-SAVING DEVICE.

1,339,227.  Specification of Letters Patent.  Patented May 4, 1920.

Application filed November 1, 1919. Serial No. 334,929.

*To all whom it may concern:*

Be it known that I, JOHN SEBETO, a citizen of the United States, and a resident of the city of New York, borough of Brooklyn, in the county of Kings and State of New York, have invented a new and Improved Life-Saving Device, of which the following is a description.

My invention relates to a parachute attachment to be strapped to aviators and passengers on aircraft for use in an emergency, whereby the user may safely jump from a falling or burning airship to save himself.

The general object of my invention is to provide an attachment of the indicated character in which a parachute is held in compact form in a container adapted to be securely strapped to the body of an aviator or an aircraft passenger and in a manner that the parachute may be caused to be automatically and instantly ejected from the container and caused to spread or fill when ejected.

A further object of the invention is to insure the filling or spreading of the parachute and its secure connection with the body of the user whereby the user will be safely suspended from the parachute through the medium of the container and caused to descend in safety.

The invention more specifically has for an object to provide controlling means for the parachute ejector normally held against operation but adapted to be conveniently and instantly released to cause the parachute to be ejected.

The above and other objects are attained by an attachment having the novel features hereinafter particularly described and claimed.

Reference is to be had to the accompanying drawings forming a part of this specification, it being understood that the drawings are merely illustrative of one example of the invention.

Figure 1 is a rear perspective view of a safety device embodying my invention showing the same strapped to the back of the user;

Fig. 2 is a perspective view showing the strapping means of the device as they appear at the front of the user when the attachment is secured to the body of the user;

Fig. 3 is a perspective view of the attachment;

Fig. 4 is a longitudinal vertical section of the attachment on a larger scale showing the contained parachute as well as the ejector and its controlling means;

Fig. 5 is a transverse vertical section on the line 5—5, Fig. 4;

Fig. 6 is a horizontal section on the line 6—6, Fig. 4;

Fig. 7 is a top plan with the cover of the retainer omitted.

In carrying out my invention in accordance with the illustrated example, a box-like container 10 is provided adapted to accommodate a parachute in folded form, said container being adapted to be strapped to the back of an aviator or a passenger of an aerial vessel for use in emergency, so that the parachute when expanded and in the air will safely suspend the user. For securing the container in position I employ shoulder straps 11 and at the front of the shoulder straps is a breast strap composed of billets 12 suitably secured to the shoulder straps, the one billet having a buckle 13 or equivalent means to adjustably secure the other billet 12. The container structure 10 is preferably formed with an intermediate downwardly tapering portion $10^b$ below the container proper, the ends $10^a$ of the container proper overhanging said portion $10^b$; the extreme lower end $10^c$ of the container structure has approximately parallel sides. The shoulder straps are here shown as secured to rings 14 on the ends $10^a$ and the opposite ends of said straps are conveniently secured to rings 15 on the sides of the tapering portion $10^b$. I provide a crotch strap in addition to the shoulder straps for the secure fastening of the container in position and for the safe suspension of the user. In the preferred form a transverse strap 16 is connected at its opposite ends with the rings 15 at the inner side of the container structure and the crotch strap 18 is suitably secured as at 17 to the center of said cross strap 16. The crotch strap has a length to pass downwardly and forwardly through the crotch of the user and upwardly to the breast strap 12 to which it is secured detachably, advantageously by forming a loop 19 on the upper edge of the crotch strap through which one of the billets of the breast strap is passed. The container 10 has a removable top 20 which may, as shown, simply rest on the upper edge of the container, said top being shown with a flange $20^a$ extending outside of the container, the flange having sufficient frictional engagement with the container to normally hold the top in place.

A parachute 21 in its collapsed form is folded to be accommodated in the container 10 and its suspension rope 22 is suitably fastended at one end to the parachute in the usual manner. Said suspension rope when the parachute is in the container is laid along the parachute in a manner to permit it to readily unwind and it is passed outwardly to the exterior of the container as through an orifice 20$^b$, (Fig. 3) and is suitably fastened to the container structure, preferably at the inner side thereof. The means for securing the rope 22 to the container in the illustrated form is by a rope 23 secured to said suspension rope and looped through rings 24 on the container structure.

I provide controlled means associated with the container 10 for automatically ejecting the parachute when said means is released. For the purpose, use is made of an ejector 25 disposed in the container 10 at the bottom forming in effect a false bottom therefor, said ejector being carried by the upper end of a plunger 26 extending downwardly through a tubular inclosing guide 27 in the reduced portion 10$^b$ and extending into a similar tubular guide 31 in the lower portion 10$^c$ of the container structure. The tubular guide 31 has a vertical slot 32 therein through which projects an arm 33 rigid with the plunger 26, being formed upon or secured to the latter, there being shown a hub or collar 34 secured to the plunger by a transverse pin or the like 34$^a$. The rod 26 is turnable relatively to the ejector 25 and the arm 33 is thus adapted to be turned laterally to engage in a notch 35 at a side of the slot 32. A spring 28 coiled about the plunger rod in the guide 27 abuts at its upper end against a collar or flange 29 on said plunger and abuts at its lower end against a partition 30 in the container structure, said spring tending to force the plunger 26 and ejector 25 upwardly. By the described arrangement when the ejector 25 is in the lower position in container 10 to accommodate the parachute 21, and the arm 33 is engaged in the notch 35, the plunger rod is locked and the spring 28 held under compression. A slight turn of the arm 33 to bring the same into the slot 32 permits the spring 28 to react and force the plunger and ejector upwardly, thereby ejecting the parachute 21 from the container. The arm 33 is optionally releasable by any suitable means accessible to the user when the device is strapped in position, there being shown for the purpose a pull wire or cord 36 on said arm 33 extending outwardly in the illustrated example through a hole 37 in a door 38 hinged as at 39 at a side of the lower portion 10$^c$. As seen in Fig. 2 the user can reach around to the back and exert a slight pull on the device 36 to release the ejector. Any other suitable means may be provided for maintaining the ejector inoperative.

In order to insure the spreading and filling of the parachute when ejected, I provide a spring preferably an elongated plate spring 40 and this I coil more or less within the parachute adjacent to the open end thereof, the spring being disposed transversely in the container 10 as indicated in Fig. 7, so as to exert friction against the sides of said container which friction is overcome by the force of the spring 28 when the ejector is released. Thus, upon the parachute being thrown into the air, the spring 40 will expand and open up the parachute causing the latter to quickly fill with air.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new and desire to secure by Letters Patent:

1. A device of the class described including a container adapted to accommodate a parachute in collapsed form and having means to connect the suspension rope of the parachute with said container, a controlled ejector in said container adapted to eject the parachute, rings on the container at the sides, shoulder straps secured to said rings, a transverse strap at the front of the container, and connected at its ends with said rings, a crotch strap secured at one end to said transverse strap at the approximate center, and means to secure the front end of the crotch strap to the shoulder straps.

2. A device of the class described including a container adapted to accommodate a parachute in collapsed form and to have the suspension rope of the parachute secured thereto, an ejector in the bottom of the container, a plunger mounting said ejector and adapted to be partially turned, a lateral arm on said plunger, a spring acting on the plunger and normally tending to raise the same and the ejector for ejecting the parachute, and means on the container structure presenting a notch in which said arm may be engaged by a partial turning of the plunger.

JOHN SEBETO.